United States Patent
Yoo et al.

(10) Patent No.: US 6,388,718 B1
(45) Date of Patent: May 14, 2002

(54) LCD PROJECTOR OF TWO-PLATE TYPE

(75) Inventors: Jinn-Chou Yoo; Kuo-tung Tiao; Fu-Ming Chuang; Wei Shen, all of Hsinchu; Chun-Chuan Lin; Sen-Chrong Shiau, both of Changhua, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/302,834

(22) Filed: Apr. 30, 1999

(30) Foreign Application Priority Data

Nov. 13, 1998 (TW) ........................ 87118906 A

(51) Int. Cl.[7] .................... G02F 1/1333; G02F 1/1335
(52) U.S. Cl. .................... 349/9; 349/5; 349/8
(58) Field of Search ................ 349/8, 9, 5, 6, 349/7, 80

(56) References Cited

U.S. PATENT DOCUMENTS

| | | | |
|---|---|---|---|
| 4,758,818 A | * 7/1988 | Vatne | 340/701 |
| 4,991,941 A | * 2/1991 | Kalmanash | 350/347 |
| 5,041,869 A | * 8/1991 | Frick | 355/68 |
| 5,414,544 A | * 5/1995 | Aroyagi | 359/53 |
| 5,528,262 A | * 6/1996 | McDowall | 345/151 |
| 5,774,254 A | * 6/1998 | Berlin | 359/259 |
| 5,798,807 A | * 8/1998 | Prehn | 349/76 |
| 5,877,824 A | * 3/1999 | Sarayeddine | 349/9 |
| 5,885,736 A | * 3/1999 | Hirai | 430/7 |
| 6,113,239 A | * 9/2000 | Sampsell | 353/31 |
| 6,152,566 A | * 11/2000 | Hashizume | 353/20 |
| 6,157,419 A | * 12/2000 | Mitsutake | 349/9 |

* cited by examiner

Primary Examiner—William L. Sikes
Assistant Examiner—Hoan C. Nguyen
(74) Attorney, Agent, or Firm—Knobbe, Martens, Olson & Bear, LLP

(57) ABSTRACT

An LCD projector of two-plate type is disclosed. The LCD projector comprises a light source, a color valve, a dichroic mirror, a polarization rotating device, a polarization beam splitter, a first reflective LCD panel, a second LCD panel and a projection lens. The first reflective LCD panel is used to modulate the green light with the green component of the image signal. The red light and the blue light are modulated in a time field sequential manner by the color valve and the second reflective LCD panel.

8 Claims, 4 Drawing Sheets

LCD PROJECTOR OF TWO-PLATE TYPE

BACKGROUND OF THE INVENTION

1. Field of the Invention

This invention relates to an LCD (liquid crystal display) projector of two-plate type.

2. Description of Prior Art

Since mass production of LCD projectors began in 1989, many technical problems have been solved. For example, the use of optical lens array integrators or glass rod integrators has overcome the problem of uneven illumination on the LCD panel, as well as energy loss due to the mismatch of the illumination distribution of the light source and the shape of the LCD panel. In addition, the use of polarization conversion techniques has overcome the problem of energy loss due to polarized light absorption. Further, a dichroic mirror has been used to solve the problem of color gradation on the image display. High resolution (such as VGA, SVGA, XGA), high density (e.g., 1.3", 1024×768) and high image quality (in which the contrast is larger than 200:1) have been achieved by a high temperature poly-TFT LCD.

Nowadays, an LCD can provide a luminance efficiency of about 10 lm/W. For example, EPSON Co.'s ELP-7300 has the highest efficiency among all displays, including CRT, PDP, LED and FEL, etc. The development of LCD devices today is directed toward a high brightness greater than 1200 ANSI lumens, a high resolution greater than 1280×1024, light weight and compact size.

Conventional LCD projectors are normally either three-plate type or one-plate type, both of which use a transparent type LCD panel. However, in order to maintain the size of the LCD panel as the resolution becomes higher, the transparent LCD panel has to be replaced by a reflective type LCD panel to enlarge the numerical aperture.

A In a reflective type LCD panel, the TFT is formed under the reflective metal layer. Because it is not necessary to form a black matrix to prevent current leakage from the TFT when the TFT is illuminated, each pixel on a reflective type LCD panel has a smaller size and a better numerical aperture than on a transparent type LCD panel. The light collective efficiency of an illumination system has its upper limit when a bulb having a specified arc distance is used to illuminate a certain area under a certain divergent angle.

However, the optical construction of a reflective type LCD device is more complex than transparent type LCD device. Moreover, a reflective type LCD device needs to use a polarization beam splitter. In a reflective type LCD device, the light passing through the polarization beam splitter is provided with a certain polarization, becoming thereby, for example, a P-polarized light beam. The P-polarized light beam is modulated and reflected by the LCD panel and then becomes an S-polarized light beam. Thereafter, the S-polarized light beam is reflected by the polarization beam splitter and is then projected to the screen. In an LCD device, the polarization beam splitter must have an excellent beam-splitting effect across the whole visible range, i.e., 400 nm to 700 nm to avoid color distortion. The beam-splitting ratio of S-polarization and P-polarization must meet the requirements of the LCD device even if there is a large incident angle. A larger incident angle of the LCD panel means a higher light collective efficiency for the display device. However, such an LCD panel is very difficult to design and fabricate. Thus, the polarization beam splitter is the critical element restricting the optical characteristics of the reflective type LCD device.

Since a reflective LCD projector needs to use a polarization beam splitter, the projection lens must have a long rear focus so as to place these elements between the PBS and the LCD panel. The rear focus of a reflective type LCD projector is longer than that of a transparent type. This results in a complex design for the LCD projector.

Referring to FIG. 1, a reflective type LCD projector includes: a light source 10, a pre-polarizer 12, a polarization beam splitter 14, a dichroic prism 16, LCD panels 18a~18c and a projection lens 20. The light source 10 emits a non-polarized light. The non-polarized light is polarized to be a linearly polarized light by the pre-polarizer 12. The linearly polarized light is reflected to the dichroic prism 16 by the polarization beam splitter 14. The dichroic prism 16 reflects the red component and the blue component of the polarized light but passes the green component. The green component, blue component and red component are respectively projected to the LED panels 18a~18c. The LCD panels 18a~18c modulate the light with green, blue and red video signals, respectively. The polarization direction of the above green, blue and red light beams is perpendicular to the original polarization direction after reflection by the LCD panels 18a~18c. Therefore, the green, blue and red lights can transmit through the polarization beam splitter 14 and then are projected to the screen 22 by the projection lens 20.

The conventional reflective LCD projector has a long rear focus and is difficult to design since it has a dichroic prism and a polarization beam splitter. Additionally, the projection lens used in the conventional LCD projector is costly. Further, a color deviation is caused since the input light of the projector is S-polarized light and the output light is P-polarized. Furthermore, there is a spectrum shift between the S-polarized light and the P-polarized light caused by the coatings on the dichroic prism and the polarization beam splitter. Moreover, the polarization beam splitter must be broadband since it has to polarize the whole range of visible light. In other words, the polarization beam splitter is complex and costly. Further, the light collection of the LCD projector is difficult since the numeric aperture (N.A.) of the polarization beam splitter is small.

SUMMARY OF THE INVENTION

Accordingly, to overcome the complexity of the prior-art systems, the object of the present invention is to provide an LCD (liquid crystal display) projector of two-plate type, the structure of which is simplified to reduce the number of components so as to facilitate production and reduce cost. This LCD projector is suitable for application to projection monitors.

To achieve the above object, this invention uses two LCD panels to modulate the light of three primary colors. To provide a sufficient degree of brightness, the green light is modulated by one of the LCD panels. The red light and the blue light are alternately provided in a time sequential manner. Therefore, the polarization of the green light is distinct from the polarization of the red light and the blue light. This invention utilizes a dichroic mirror and a polarization-rotating device to separate the green light from the red light and the blue light and to provide the green light with a polarization perpendicular to that of the red light and the blue light. Therefore, the red light and the blue light are reflected by a polarization beam splitter while the green light transmits through. The red light and the blue light are separated in a time field sequential manner.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
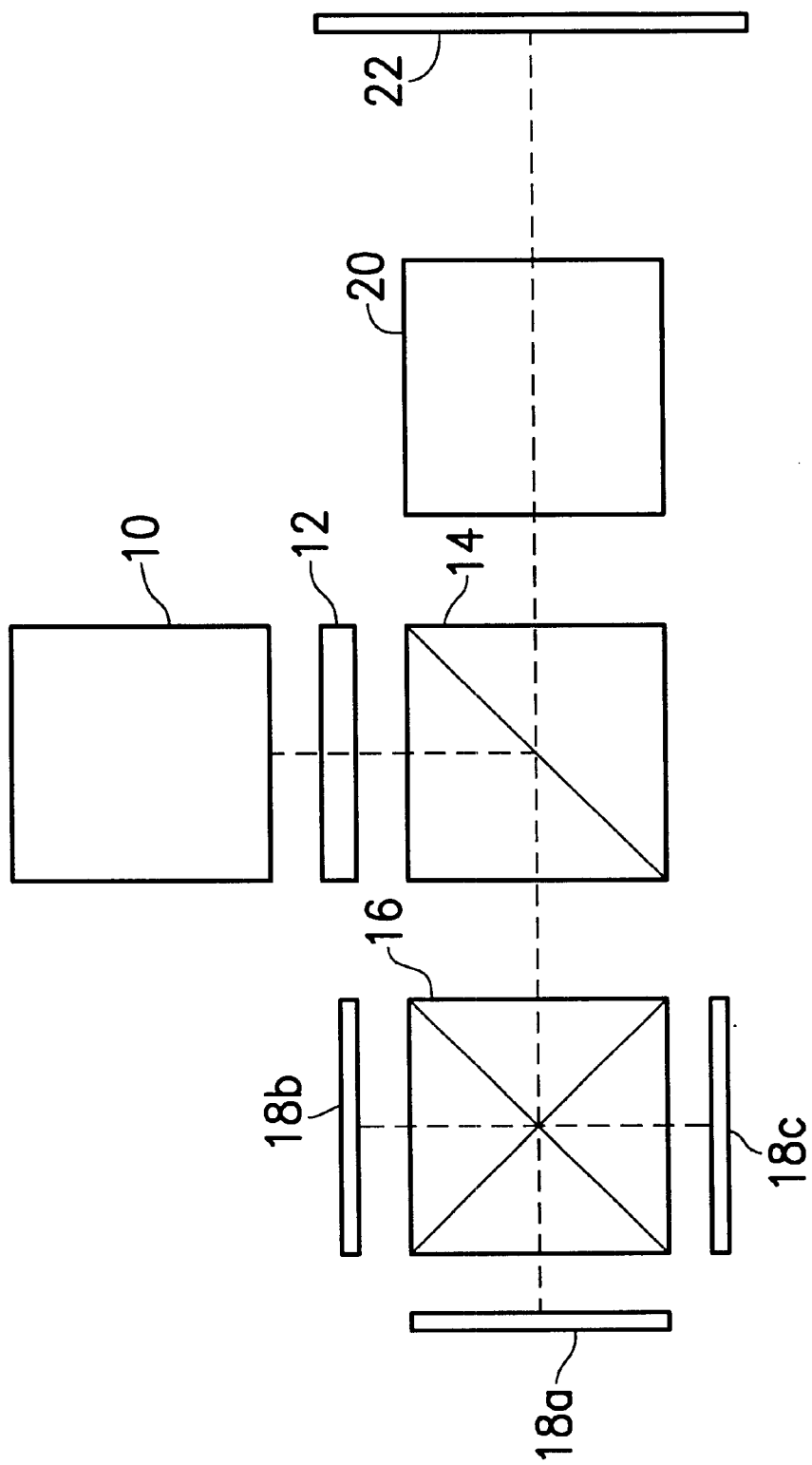
FIG. 1 is a diagram illustrating the structure of a conventional LCD projector.
Figure 2:
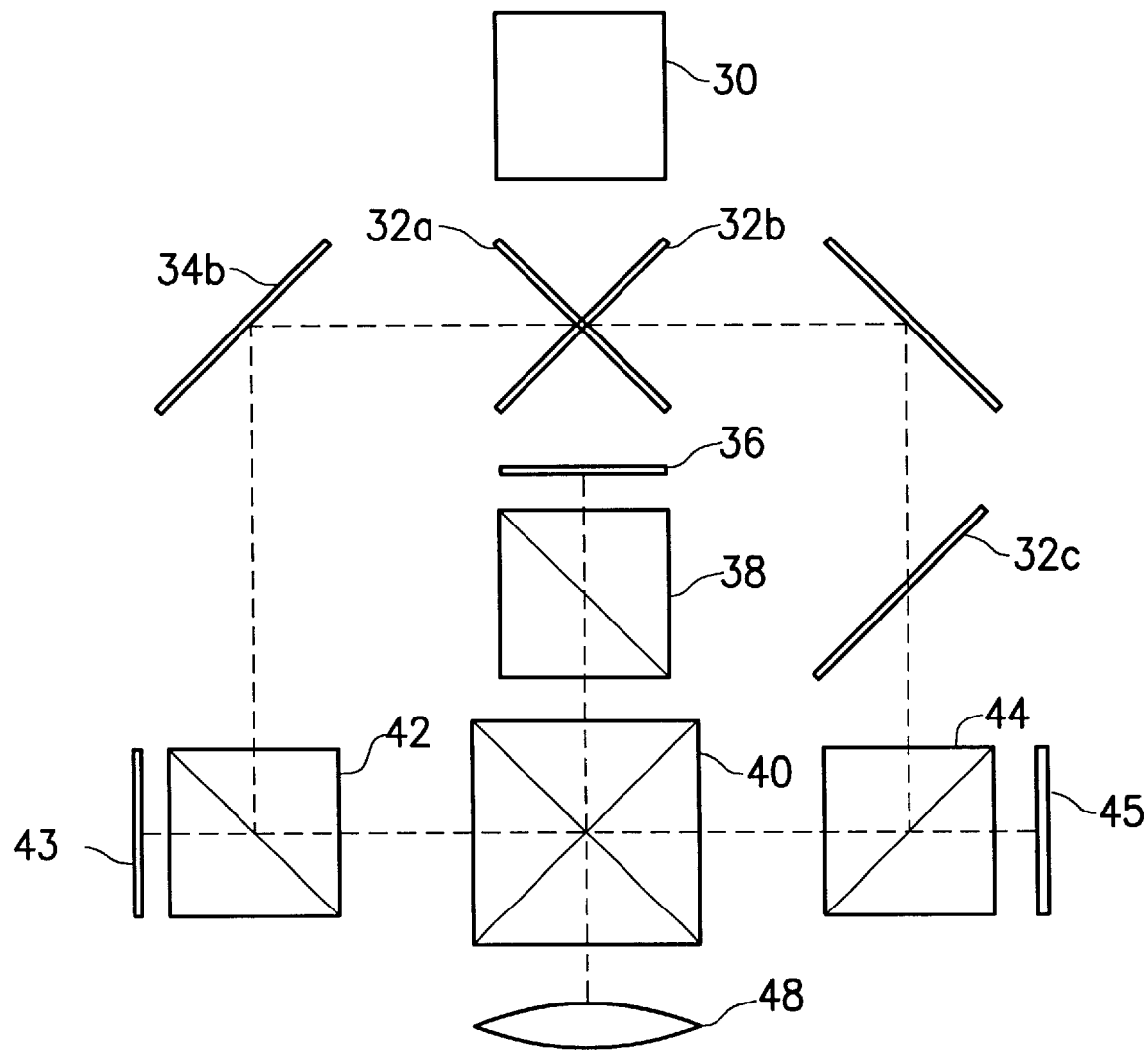
FIG. 2 is a diagram illustrating the structure of another conventional LCD projector.
Figure 3A:
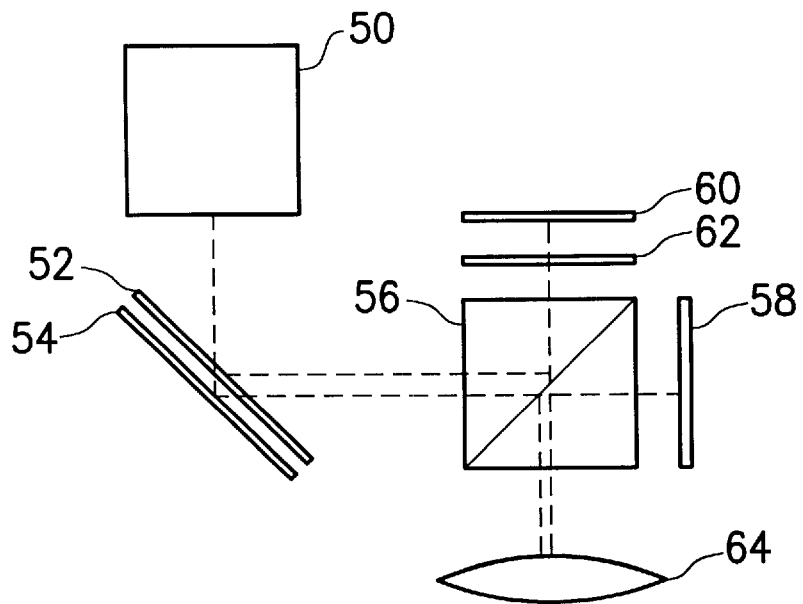
FIG. 3a is a diagram illustrating an LCD projector according to one embodiment of this invention.

Referring to FIG. 3a, the LCD projector of two-plate type according to one embodiment of this invention includes: a light source 50, a dichroic mirror 52, a polarization rotating device 54, a polarization beam splitter 56, a first reflective LCD panel 58, a second reflective LCD panel 60, a color valve 62 and a projection lens 64.

Figure 4:
FIG. 4 is a diagram illustrating the structure of the light source used in the LCD projector of this invention.
Figure 4:
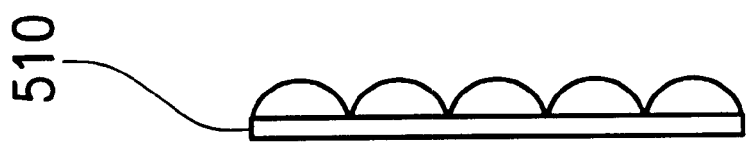
Figure 4:
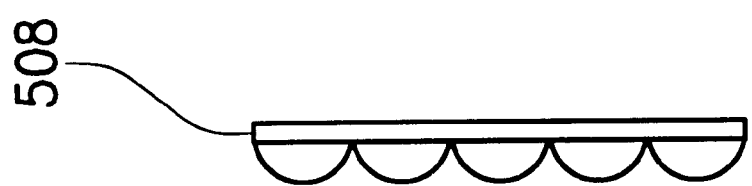
Figure 4:
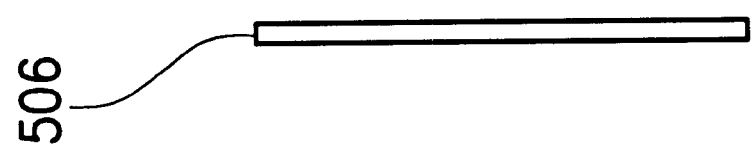
Figure 4:
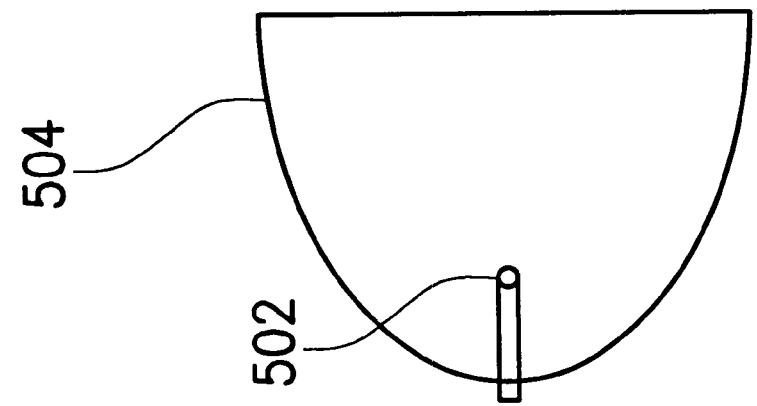

The operation of the LCD projector is described below. Referring to FIG. 4, the light source 50 comprises a lamp 502, a reflective mirror 504, a UV-IR filter 506, a first lens array 508, a second lens array 510 and a polarizer 512. The first lens array 508 and the second lens array 510 form an optical integrator which can uniformly redistribute the light intensity. The light source 50 is the same as a lamp used in a conventional projector, which can provide a uniformly polarized light beam with UV and IR components filtered out to serve as a projection light beam.

The polarized light beam provided by the light source is an S-polarized light beam, which is incident to the dichroic mirror 52 and the polarization rotating device 54. The dichroic mirror 52 can pass the green light and reflect the red light and the blue light. Therefore the red light and the blue light remains S-polarized light when reflected to the polarization beam splitter 56 by the dichroic mirror 52. The green light is transmitted through the dichroic mirror 52 and reflected by the polarization-rotating device 54, so that the green light becomes a P-polarized light when arriving at the polarization beam splitter 56. The polarization-rotating device 54 can be made of a quarter wavelength plate and a mirror.

The polarization beam splitter 56 can pass P-polarized light and reflect S-polarized light. The green light having P-polarization is hence transmitted through the polarization beam splitter 56 and is incident to the first LCD panel 58 which modulate the light with green component of the image signal. The green light modulated by the LCD panel 58 becomes an S-polarized light due to the reflection by the LCD panel 58. Then the green light having an S-polarization is again incident to the polarization beam splitter 56 and is reflected to the projection lens 64.

Furthermore, the red light and the blue light having an S-polarization are reflected to the color valve 62 and the second LCD panel 60 by the interface of the polarization beam splitter 56 after being incident to the polarization beam splitter 56. The color valve 62 and the second LCD panel 60 provide the time field sequential modulation for the two the red light and the blue light. That is, the reflective LCD panel 60 modulates the red light while the color valve 62 passes the red light. The red light is thus modulated and reflected by the LCD panel 60 and becomes P-polarized light. Then the P-polarized red light is incident to the polarization beam splitter 56 and passes its interface to be projected to the screen by the projection lens 64. The blue light is processed in the same way as the red light. The color valve 62 is open to pass the blue light at the time the blue component of the image signal is provided on the reflective LCD panel 60. The blue light is thus modulated and reflected by the LCD panel 60 and becomes P-polarized. Then, in the same way as the red light, the P-polarized blue light is incident to the polarization beam splitter 56 and passes its interface to be projected to the screen by the projection lens 64.

The time field sequential operation of the red light and the blue light alternately presents the red component and the blue component of the image signal on the LCD panel 60 in a period of 1/120 seconds. The green component of the image signal is presented on the LCD panel 58 in a period of 1/60 seconds. A full-color display can be achieved since the green component provides a larger part of brightness (about 70~80% of total brightness). This is the reason that the red component and the blue component of the image signal are presented in a time field sequential manner.

Figure 3B:
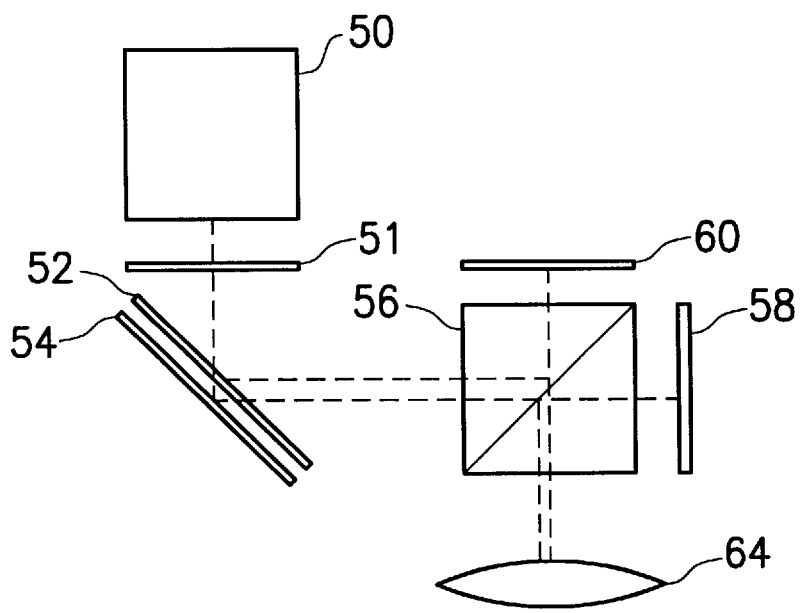
FIG. 3b is a diagram illustrating an LCD projector according to another embodiment of this invention.

Referring to FIG. 3b, the LCD projector according to another embodiment of this invention comprises: a light source 50, a color valve 51, a dichroic mirror 52, a polarization rotating device 54, a polarization beam splitter 56, a first reflective LCD panel 58, a second reflective LCD panel 60, and a projection lens 64.

The difference between this embodiment and the previous embodiment is the position of the color valve. In this embodiment, the color valve 51 is positioned between the light source 50 and the dichroic mirror 52. The operation of this embodiment is the same as the previous embodiment, and the description is therefore omitted.

The color valve can be a rotary disk or an electronic color shutter. In the first embodiment, the color valve 62 is used to pass the red light or the blue light since it is located between the polarization beam splitter 56 and the second reflective LCD panel 60. However, the color valve needs to pass the red light and the blue light, as well as the green light, in the second embodiment since it is located between the light source 50 and the dichroic mirror 52.

Compared with the conventional LCD projector of three-plate type, the LCD projector of two-plate type of this invention uses a reduced number of components, thus having a more compact design. Furthermore, the rear focal length of the projection lens can be reduced since the LCD projector of this invention uses only one polarization beam splitter. Therefore, the LCD projector of this invention has the advantages of low cost and easy installation.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives that have been discussed above and all equivalents thereto.

What is claimed is:

1. An LCD projector of two-plate type comprising: a light source, a color valve, a dichroic mirror, a polarization rotating device, a polarization beam splitter, a first reflective LCD panel, a second LCD panel and a projection lens, wherein said light source provides a polarized light with a first polarization direction, which is separated into a first color, a second color and a third color of light beams by said dichroic mirror, and the first color and the second color of light beams are reflected by said dichroic mirror, and the third color of light beam passes the dichroic mirror and is then reflected by said polarization rotating device so that the polarization direction of the third color of light beam is changed to a second polarization direction, the first color and the second color of light beams having a first polarization direction and the third color of light beam having a second polarization direction are incident to said polarization beam splitter, in which the third color of light beam is reflected by said first LCD panel after passing through said polarization beam splitter so that the polarization direction of the third color of light beam is changed to the first polarization direction, the third color of light beam is incident to the polarization beam splitter and reflected to said projection lens; the first color and the second color of light beams are reflected to said second LCD panel which has a modulating frequency twice that of said first LCD panel and is used to respectively modulate the first color and the second color of light beams by incorporated with said color valve in a time sequential manner, and then the first color and the second color of light beams are reflected so that the polarization direction of which becomes the second polarization direction, thereafter the first color and the second color of light beams are sequentially transmitted through said polarization beam splitter and incident to said projection lens.

2. An LCD projector as claimed in claim 1 wherein said color valve is a rotary disk.

3. An LCD projector as claimed in claim 1 wherein said color valve is an electronic color shutter.

4. An LCD projector as claimed in claim 1 wherein said color valve is placed between said light source and said dichroic mirror.

5. An LCD projector as claimed in claim 1 wherein said color valve is placed between said polarization beam splitter and said second LCD panel.

6. An LCD projector as claimed in claim 1 wherein the first color is red, the second color is blue, and the third color is green.

7. An LCD projector as claimed in claim 1 wherein said polarization rotating device includes a quarter wavelength plate and a mirror.

8. An LCD projector as claimed in claim 1 wherein said light source includes a lamp, a reflective mirror, a first lens array, a second array and a polarizer, said lamp providing an unpolarized light formed into a light beam by the reflective mirror, said first lens array and said second lens array redistributing the light intensity, and said polarizer providing the light beam with a first polarization direction.

* * * * *